United States Patent [19]

Rines

[11] 4,376,390
[45] Mar. 15, 1983

[54] FIBER OPTIC ANGULAR ACCELEROMETER

[75] Inventor: Glen A. Rines, Brookline, N.H.

[73] Assignee: Sanders Associates, Inc., Nashua, N.H.

[21] Appl. No.: 245,805

[22] Filed: Mar. 20, 1981

[51] Int. Cl.³ .............................................. G01P 15/08
[52] U.S. Cl. ................................. 73/517 A; 73/653
[58] Field of Search .................. 73/514, 515, 516 R, 73/517 R, 517 B, 517 A, 653, 655; 350/96.15, 96.20, 96.29; 250/227, 231 R

[56] References Cited

U.S. PATENT DOCUMENTS

| | | | |
|---|---|---|---|
| 3,146,057 | 8/1964 | Rona | 73/517 R X |
| 3,224,279 | 12/1965 | Galli et al. | 73/517 R |
| 3,310,978 | 3/1967 | Davis | 73/516 R X |
| 3,545,282 | 12/1970 | Kennedy et al. | 73/514 |

FOREIGN PATENT DOCUMENTS 419827  8/1974  U.S.S.R. ............................ 73/517 R

*Primary Examiner*—James J. Gill
*Attorney, Agent, or Firm*—Louis Etlinger; Richard I. Seligman

[57] ABSTRACT

A fiber optic angular accelerometer is provided by employing a flexible membrane having an optical fiber attached thereto, an input optical fiber for coupling light to the fiber attached to the flexible membrane and an output optical fiber for receiving light from the optical fiber attached to the flexible membrane whereby angular accelerations will occasion flexing of the flexible membrane and cause the optical fiber attached thereto to pivot about the point of attachment and occasion a change in light transmitted between the input and output optical fibers.

32 Claims, 13 Drawing Figures

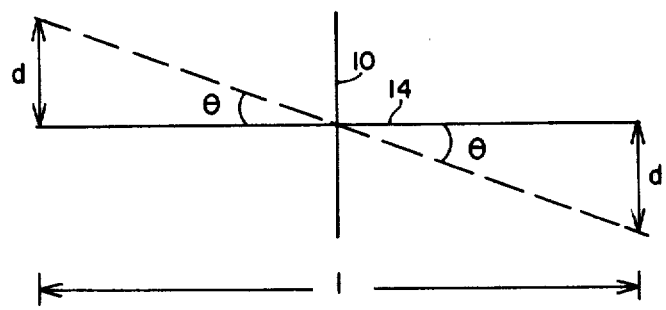
FIG. 3
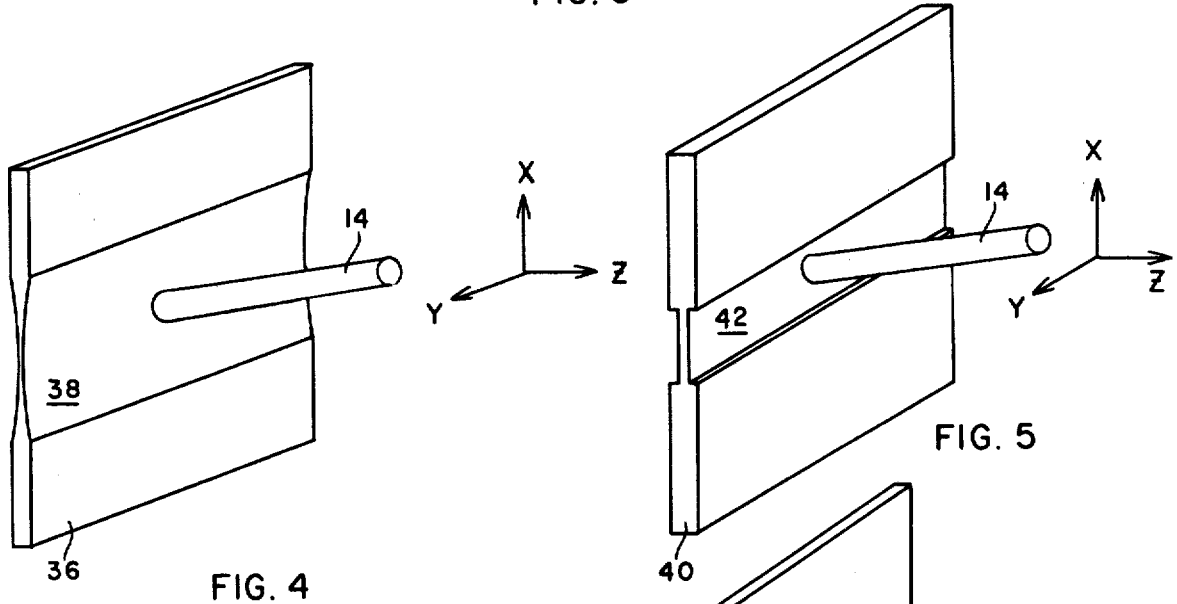
FIG. 4
FIG. 5
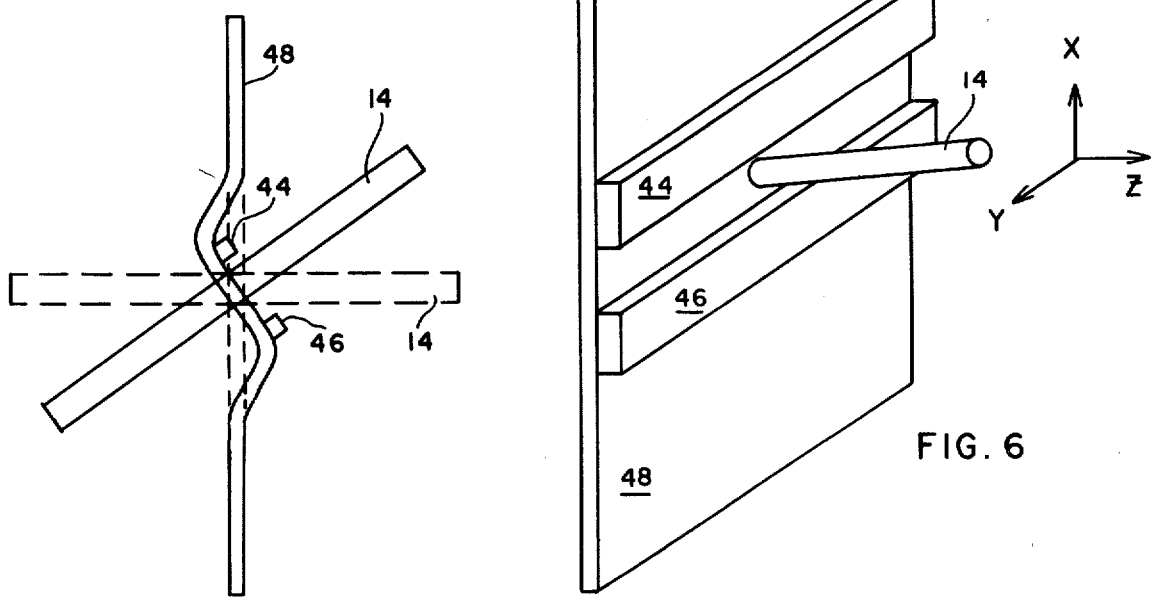
FIG. 7
FIG. 6

FIBER OPTIC ANGULAR ACCELEROMETER

BACKGROUND OF THE INVENTION

This invention relates to angular accelerometers and more particularly to fiber optic angular accelerometers.

There are many requirements for angular accelerometers. Presently these requirements are generally filled by rate gyroscopes, angular differentiating accelerometers, magnetohydrodynamic angular rate sensors, etc. These devices while operating adequately for many applications have disadvantages in that they are limited in sensitivity, environmental hardness and bulkiness.

Accordingly, it is an object of this invention to provide an improved angular accelerometer.

It is another object of this invention to provide an angular accelerometer using optical fibers.

SUMMARY OF THE INVENTION

Briefly in one embodiment an inexpensive, relatively simple, small, light weight, sensitive angular accelerometer is achieved by providing a housing containing a flexible membrane therein. An optical fiber is attached at one point to the flexible member and will pivot about the point of attachment to the flexible membrane when the housing undergoes angular accelerations. The device also includes an input optical fiber to couple light to one end of the optical fiber attached to the flexible membrane and an output optical fiber to receive light from the other end of the optical fiber attached to the flexible membrane. When the housing undergoes angular accelerations the flexible membrane will move causing the optical fiber attached thereto to pivot about the point of attachment and occasion a change in the light transmitted from the input optical fiber to the output optical fiber.

BRIEF DESCRIPTION OF THE DRAWINGS

The above-mentioned and other features and objects of this invention will become more apparent by reference to the following description taken in conjunction with the accompanying drawings, in which:

FIG. 3 is a simplified diagram illustrating the operation of the fiber optic angular accelerometer of FIG. 1;

FIG. 4 is a perspective view of an embodiment of a flexible membrane for improving the directionality of the fiber optic angular accelerometer of FIG. 1, FIG. 5 is a perspective view of another embodiment of a flexible membrane;

FIG. 6 is a perspective view of a further embodiment of a flexible membrane;

FIG. 7 is a diagram illustrating the flexible membrane of FIG. 6 when deflected;

DESCRIPTION OF PREFERRED EMBODIMENTS

Figure 1:
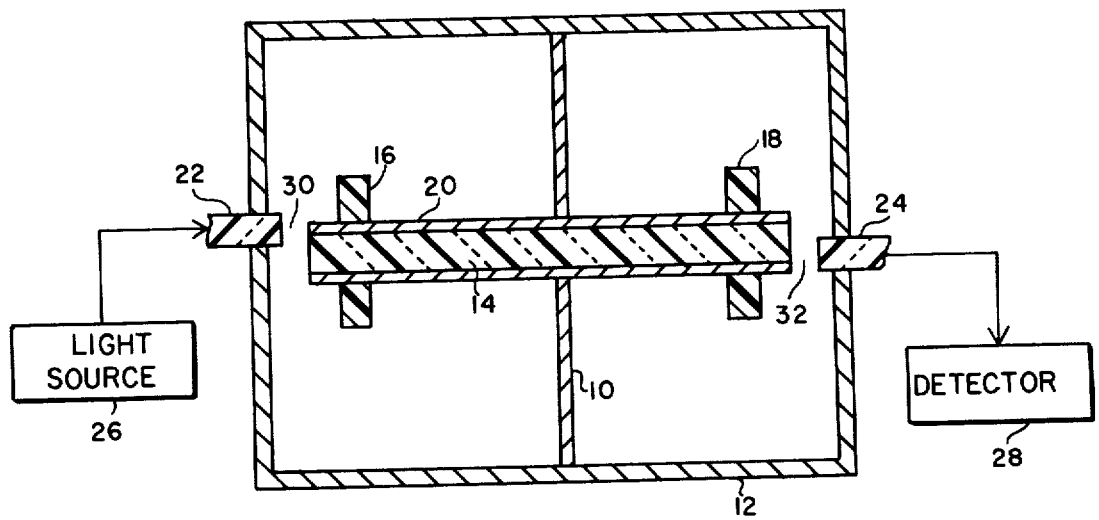
FIG. 1 is a partial cross-sectional view of a fiber optic angular accelerometer.

Referring now to FIG. 1 of the drawings, there is illustrated thereby an embodiment of a fiber optic angular accelerometer according to the principles of the invention. Principal components of the fiber optic angular accelerometer include a flexible membrane 10 which is disposed within a housing 12 so as to respond to angular accelerations. Flexible membrane 10 is, for example, a piece of thin metal or plastic and can be in the form of a web. Disposed within the flexible membrane 10 is a length of optical fiber 14 which is attached to the flexible membrane 10 so as to move therewith and yet not undergo any lateral translation. A pair of mass loading members 16, 18 is provided at the ends of optical fiber 14 so as to mass load the flexible membrane 10 to provide desirable resonant characteristics for the membrane. Mass loading for the membrane can also be achieved by mass loading the membrane directly. In certain applications the optical fiber 14 may not be stiff enough and may bend and, accordingly, to alleviate this problem the fiber may be disposed within a sleeve to provide stiffening, such as metal sleeve 20. However, metal sleeve 20 will not be required for all applications.

Also disposed within housing 12 are an input optical fiber 22 and an output optical fiber 24. Light is applied to input optical fiber 22 from a light source 26. While the term "light" is used throughout this specification it is to be understood that the term includes both the visible and invisible and includes all wavelengths which can be transmitted by the optical fibers. Coupled to the output fiber 24 is a detector 28 to measure the amount of light transferred between the input optical fiber 22 the optical fiber 14 and the output optical fiber 24. Light entering the input fiber 22 from light source 26 is coupled across a gap 30 to the optical fiber 14. This coupling is repeated at the junction 32 between the optical fibers 14 and 24.

The fibers are offset as shown in FIG. 1 in order to achieve linear response. The reason for this offset can be seen in the graph of FIG. 2 which shows light power coupled between fibers as a function of lateral displacement (the fiber 14 is actually being angularly and laterally translated from its quiescent coupling condition in response to angular inertial forces, however, for minute angular motion the simple lateral displacement model is adequate).

Flexible member 10 to which optical fiber 14 is attached allows fiber 14 to pivot about the point of attachment and also supplies a restoring force to return the fiber to the quiescent point.

Figure 2:
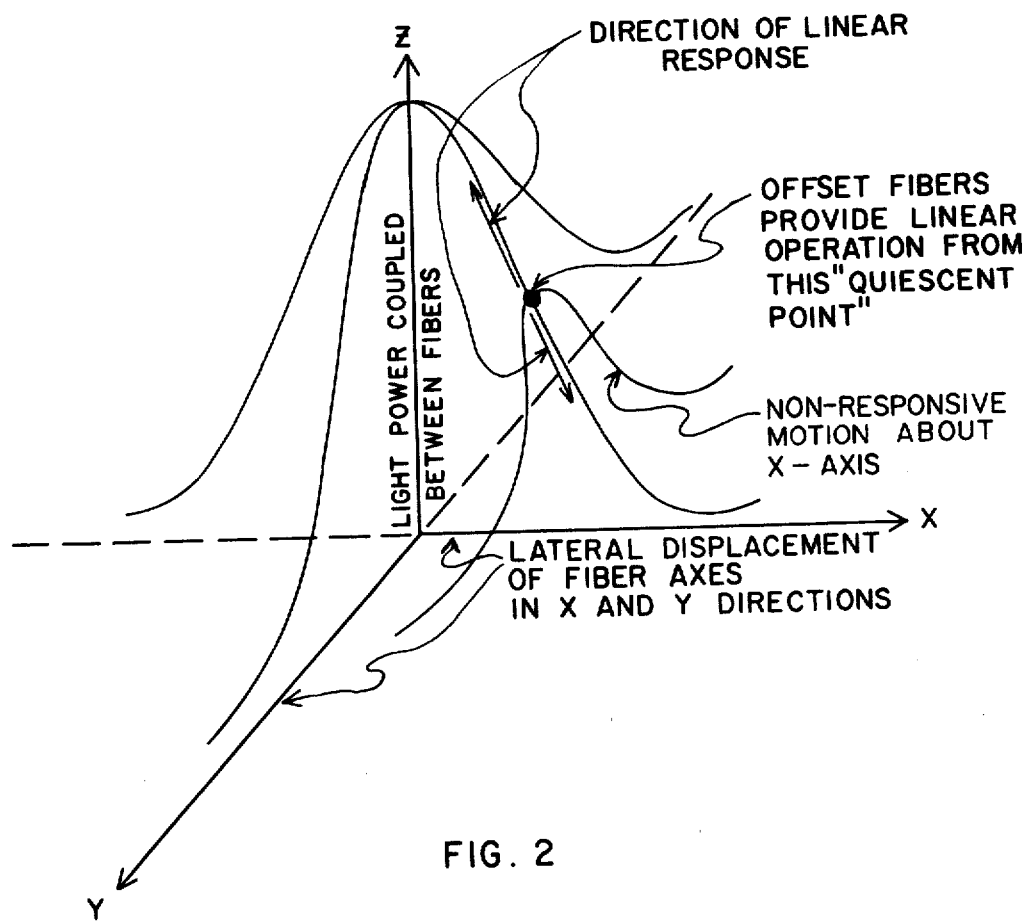
FIG. 2 is a graph illustrating how the sensitivity of the accelerometer of FIG. 1 is made linear by providing misalignment between the input and output optical fibers and the optical fiber attached to the flexible membrane.

Referring again to FIG. 1 it should be noted that only a rotation of the optical fiber 14 in the plane of the paper will provide a linear, highly sensitive response in light intensity modulation. In FIG. 2 this corresponds to a rotation in the XZ plane about the Y-axis. Rotation about the other two axes will be non-responsive in terms of intensity modulation of the optical signal passing through the transducer. Actually, rotation about the X-axis will produce a small modulation but it will be tens of decibels below the Y-axis signal. The Z-axis in FIG. 2 is parallel with the axis of the optical fiber 14, therefore, rotation about that axis would be totally non-responsive due to the circular symmetry of the fiber.

As seen in the diagram of FIG. 3 the lateral displacement sensitivity of the fiber ends can be converted to an angular sensitivity based on the length of the fiber 14 (The model is simplified, but provides a useful and sound preliminary analysis). Based on this analysis the angular sensitivity of, for example, a 63 micron core model of the sensor would be $$\theta = \tan^{-1} \frac{(2d)}{l}$$

where d = the displacement sensitivity based on earlier sensor work $$(10^{-12} m)$$

l = length of moving fiber

If the moving fiber length is 2 cm, the angular sensitivity becomes $$\theta = \tan^{-1} \frac{2 \times 10^{-12} m}{2 \times 10^{-2} m}$$

$$\theta \; 10^{-10} \text{ radians.}$$

The invention therefore, provides a highly sensitive fiber optic angular accelerometer of very small size and weight.

In certain instances it may be desired to fill the housing 12 with, for example, oil for damping purposes. Damping may also be provided to for example, flatten the frequent response of the sensor, by applying a coating or multiple coatings to the membrane itself, e.g. polymer coatings.

The gaps 30 and 32 are preferably made as small as possible to maximize coupling between the input optical fiber 22 and optical fiber 14 and optical fiber 14 and the output optical fiber 24. However, they are maintained far enough apart so that they will not touch during thermal expansion which might take place. Preferably the ends of the optical fibers 14, 22 and 24 are tapered to increase sensitivity.

In order to enhance directionality of the angular accelerometer response various modifications may be made to the flexible membrane 10. Representative ones of these modifications are illustrated in FIGS. 4-7. In FIG. 4, a flexible membrane 36 is substituted for the flexible membrane 10 in the embodiment of FIG. 1. This membrane is not of uniform thickness and includes a tapered portion 38. This tapered portion 38 will allow high sensitivity in the XZ plane while reducing sensitivity in the YZ plane.

FIG. 5 illustrates an alternative arrangement to that of FIG. 4 wherein membrane includes an area 42 of reduced thickness which is also used to limit deflection of the optical fiber 14 in the YZ plane.

Enhanced directionality can also be accomplished by adding stiffening members to the flexible membrane. This is shown in FIG. 6 wherein stiffening members 44 and 46 are added to the flexible membrane 48. A cross-sectional view of flexible member 48 under deflection is illustrated in FIG. 7 wherein optical fiber 14 and membrane 48 are shown deflected and undeflected (dashed lines). The stiffening members 44, 46 are positioned and dimensioned so that their mass enhances fiber deflection in the XZ plane while their stiffness parallel to the Y-axis would restrict fiber deflections in the YZ plane.

Figure 8:
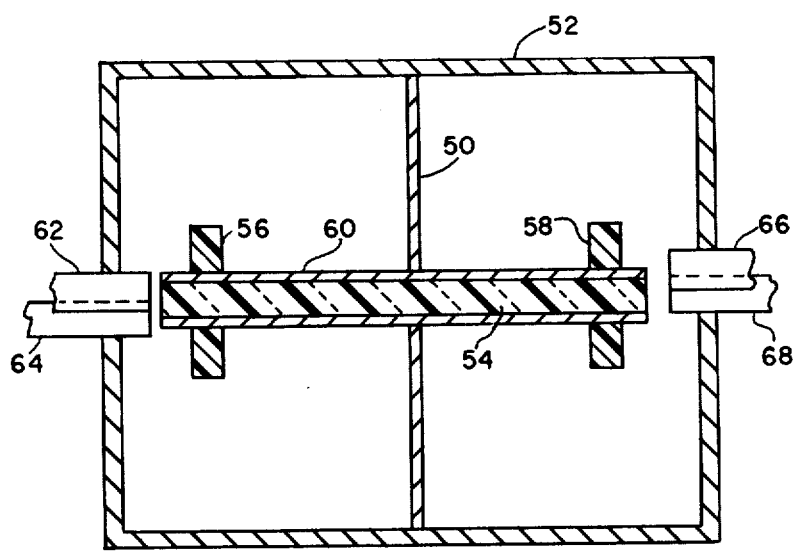
FIG. 8 is a cross-sectional view of a two axes fiber optic angular accelerometer.
Figure 9:
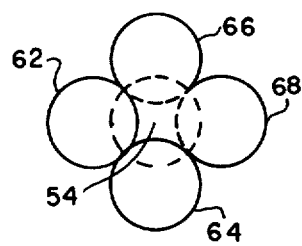
FIG. 9 is an end view of the fiber optic angular accelerometer of FIG. 8.

Referring now to FIGS. 8 and 9 of the drawings, there is illustrated another embodiment of the invention. The purpose of this embodiment is to provide a sensor responsive to angular accelerations about two axes rather than one. Like the single axis sensors this sensor includes a flexible member 50 which is disposed within a housing 52 to respond to angular accelerations. Disposed within the flexible member 50 is a length of optical fiber 54 which is attached to the flexible member 50 so as to move therewith and yet not undergo any lateral translation. As in the embodiment of FIG. 1, a pair of mass loading members 56, 58 and a stiffening member 60 may be provided, if required.

The primary difference over the sensor of FIG. 1 is the provision of two input optical fibers 62, 64 and two output optical fibers 66, 68 all of which are preferably axially offset with respect to the optical fiber 54 attached to the flexible member 50. The input pair of optical fibers 62, 64 are offset in directions orthogonal to each other. The output optical fibers 66, 68 are also orthogonally offset, but in the opposite direction as that of the corresponding input optical fiber. In this manner angular accelerations about one axis will be detected by one pair of input and output optical fibers and accelerations about an axis perpendicular to that will be detected by the other pair of optical fibers. Each input output pair has a separate light source input and detector like in the embodiment of FIG. 1. Angular accelerations about the third spatial axis, namely the axis parallel to the fiber axis, is not detectable, therefore, to provide three-dimensional angular acceleration detection requires at least two sensors.

Figure 10A:
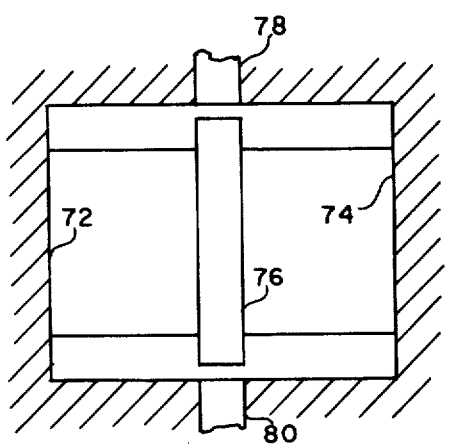
FIGS. 10A and 10B are front and side views of a fiber optic accelerometer conceptually like the embodiment of FIG. 1 but using other than flexible membranes as the responsive members.
Figure 10B:
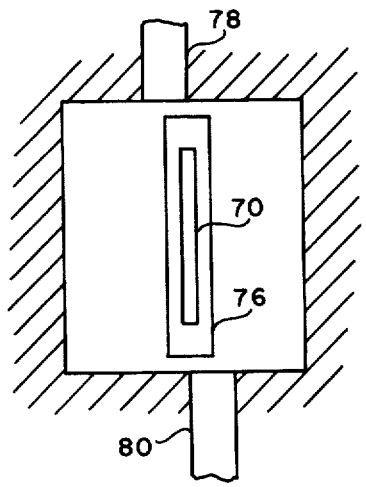

While the embodiments shown employ flexible membranes as the responsive members other flexible members may be employed. FIGS. 10A and 10B of the drawings illustrate an embodiment where the responsive member is a flexible ribbon supported at its ends 72 and 74. An optical fiber 76 is attached thereto and cooperates with input and output optical fibers 78 and 80 as in the earlier described embodiments such that light transferred between input fiber 78 and output fiber 80 will be proportional to the twisting of ribbon 70 due to angular forces imposed thereon.

Figure 11A:
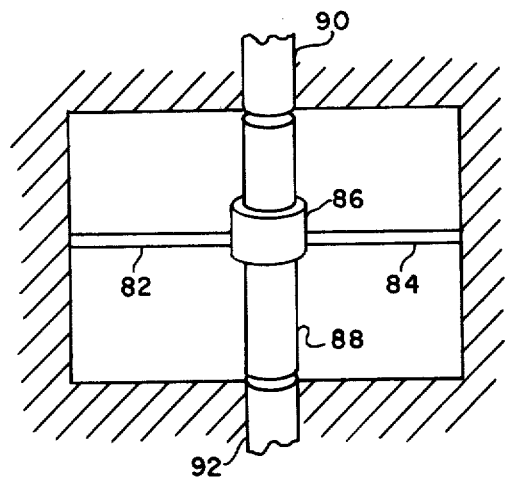
FIGS. 11A and 11B are front and side views of another fiber optic accelerometer.
Figure 11B:
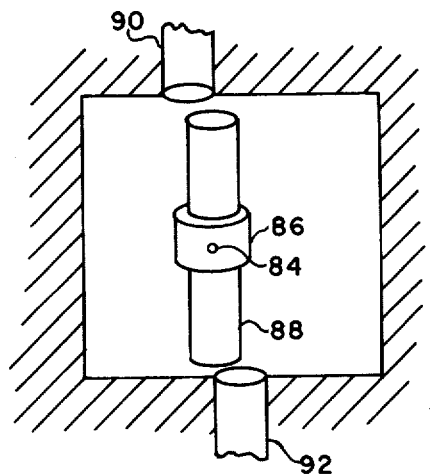

A similarly configured embodiment is illustrated in FIGS. 11A and 11B wherein the flexible member comprises torsion bars 82 and 84. The torsion bars 82 and 84 may be made of, for example, plastic. They are attached to a collar 86 disposed about and attached to optical fiber 88. Twisting of the torsion bars 82 and 84 will cause pivoting of the optical fiber 88 and vary the coupling between an input optical fiber 90 and an output optical fiber 92.

While I have described above the principles of my invention in connection with a specific apparatus, it is to be clearly understood that this description is made only by way of example and not as a limitation of the scope of my invention as set forth in the accompanying claims.

I claim:

1. A fiber optic angular accelerometer, comprising:
   a flexible member;
   an optical fiber attached to said flexible member intermediate the ends of the optical fiber such that each end of said optical fiber moves in response to the flexing of said flexible member;
   means for coupling light to one end of said optical fiber; and means for coupling light from the other end of said optical fiber, whereby angular accelerations will occasion a flexing of said member causing said optical fiber to pivot and thereby alter the coupling of light thereto and therefrom.

2. A fiber optic angular accelerometer as defined in claim 1, further including means for stiffening said optical fiber.

3. A fiber optic angular accelerometer as defined in claim 2, further including stiffening members added to said flexible membrane.

4. A fiber optic angular accelerometer as defined in claim 1, wherein said means for coupling light to one end of said optical fiber includes an input optical fiber spaced from said one end of said optical fiber.

5. A fiber optic angular accelerometer as defined in claim 4, wherein said means for coupling light from the other end of said optical fiber includes an output optical fiber spaced from said other end of said optical fiber.

6. A fiber optic angular accelerometer as defined in claim 5, further including means for applying light to said input optical fiber and means for detecting light from said output optical fiber.

7. A fiber optic angular accelerometer as defined in claim 5, further including means for mass loading said optical fiber to adjust the resonant characteristics of said flexible member.

8. A fiber optic angular accelerometer as defined in claim 1, wherein said flexible member is a flexible membrane.

9. A fiber optic angular accelerometer as defined in claim 8, further including a housing for containing said flexible membrane and said optical fiber.

10. A fiber optic angular accelerometer as defined in claim 9, wherein said housing contains a damping fluid.

11. A fiber optic angular accelerometer as defined in claim 8, wherein said flexible membrane is configured so as to enhance directionality of the accelerometer.

12. A fiber optic angular accelerometer as defined in claim 11, wherein said flexible member has a nonuniform thickness.

13. A fiber optic angular accelerometer as defined in claim 12, wherein a portion of the thickness of said flexible membrane is tapered.

14. A fiber optic angular accelerometer as defined in claim 12, wherein an area about the center of said flexible membrane is of a reduced thickness.

15. A fiber optic angular accelerometer, comprising:
a flexible member;
an optical fiber attached to said flexible member;
an input optical fiber for coupling light to one end of said optical fiber, said input optical fiber and said optical fiber being spaced in an offset fashion; and
an output optical fiber for coupling light from the other end of said optical fiber, whereby angular accelerations will occasion a flexing of said member causing said optical fiber to pivot and thereby alter the coupling of light thereto and therefrom.

16. A fiber optic angular accelerometer as defined in claim 15, wherein said output optical fiber and said optical fiber are spaced in an offset fashion.

17. A fiber optic angular accelerometer as defined in claim 16, wherein said input and output offsets are in opposite directions.

18. A fiber optic angular accelerometer, comprising:
a flexible membrane;
an optical fiber attached to said flexible membrane; said flexible membrane having stiffening members disposed thereon to enhance directionality of the accelerometer including a first stiffening member disposed adjacent one side of said optical fiber and a second stiffening member disposed adjacent the opposite side of said optical fiber whereby sensitivity is increased in one plane and reduced in another plane;
means for coupling light to one end of said optical fiber; and
means for coupling light from the other end of said optical fiber, whereby angular accelerations will occasion a flexing of said membrane causing said optical fiber to pivot and thereby alter the coupling of light thereto and therefrom.

19. A bidirectional fiber optic angular accelerometer, comprising:
a flexible member;
an optical fiber attached to said flexible member, said optical fiber having a first central axis;
first means for coupling light to one end of said optical fiber along a second axis parallel to but laterally displaced from said first axis;
second means for coupling light to one end of said optical fiber along a third axis parallel to but literally displaced from said first axis; and displaced in a direction perpendicular to the lateral displacement of the second axis;
third means for coupling light from the other end of said optical fiber along a fourth axis parallel to but laterally displaced from said first axis; and displaced in the direction opposite to that of the second axis; and
fourth means for coupling light from the other end of said optical fiber along a fifth axis parallel to but laterally displaced from said first axis and displaced in a direction perpendicular to said second and fourth axes and opposite that of said third axis.

20. A bidirectional fiber optic angular accelerometer as defined in claim 19, wherein said first, second, third and fourth coupling means include first, second, third and fourth optical fibers.

21. A bidirectional fiber optic angular accelerometer as defined in claim 19, further including a housing for containing said flexible member and said optical fiber attached thereto.

22. A bidirectional fiber optic angular accelerometer as defined in claim 19, further including means for mass loading said optical fiber attached to said member.

23. A bidirectional fiber optic angular accelerometer as defined in claim 19, further including means for stiffening said optical fiber attached to said member.

24. A bidirectional fiber optic angular accelerometer as defined in claim 19, wherein said flexible member is a flexible membrane.

25. A bidirectional fiber optic angular accelerometer as defined in claim 24, wherein said flexible membrane has a coating thereon to provide damping.

26. A bidirectional fiber optic angular accelerometer as defined in claim 19, wherein said second and fourth axes are not coincident.

27. A bidirectional fiber optic angular accelerometer as defined in claim 26, wherein said third and fifth axes are not coincident.

28. A bidirectional fiber optic angular accelerometer as defined in claim 27, wherein said housing contains a damping fluid.

29. A fiber optic angular accelerometer, comprising:

a flexible membrane having a coating thereon to provide damping;
an optical fiber attached to said flexible membrane;
means for coupling light to one end of said optical fiber; and
means for coupling light from the other end of said optical fiber, whereby angular accelerations will occasion a flexing of said membrane causing said optical fiber to pivot and thereby alter the coupling of light thereto and therefrom.

30. A fiber optic angular accelerometer, comprising:
a flexible membrane;
an optical fiber attached to said flexible membrane;
said flexible membrane having a non-uniform thickness to enhance directionality of the accelerometer, said flexible membrane being thinner at the point where said optical fiber is attached so as to increase sensitivity in one plane and reduce sensitivity in another plane;
means for coupling light to one end of said optical fiber; and
means for coupling light from the other end of said optical fiber, whereby angular accelerations will occasion a flexing of said membrane causing said optical fiber to pivot and thereby alter the coupling of light thereto and therefrom.

31. A fiber optic angular accelerometer as defined in claim 30, wherein a portion of the thickness of said flexible membrane is tapered.

32. A fiber optic angular accelerometer as defined in claim 30, wherein an area about the center of said flexible membrane is of a reduced thickness.

* * * * *